United States Patent
Ivonnet et al.

(10) Patent No.: US 8,010,077 B2
(45) Date of Patent: Aug. 30, 2011

(54) DC OFFSET CALIBRATION IN A DIRECT CONVERSION RECEIVER

(75) Inventors: Jorge Ivonnet, Chandler, AZ (US); Chuanzhao Yu, Phoenix, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 739 days.

(21) Appl. No.: 12/106,601

(22) Filed: Apr. 21, 2008

(65) Prior Publication Data

US 2009/0264090 A1 Oct. 22, 2009

(51) Int. Cl.
*H04B 1/26* (2006.01)

(52) U.S. Cl. ............... 455/324; 455/310; 455/232.1; 375/346

(58) Field of Classification Search .............. 455/324, 455/323, 230, 231, 232.1, 234.2, 241.1, 246.1, 455/245.1; 375/295, 296, 298, 300, 224, 375/283, 307, 346
See application file for complete search history.

(56) References Cited

U.S. PATENT DOCUMENTS

| | | | | |
|---|---|---|---|---|
| 6,240,100 | B1 * | 5/2001 | Riordan et al. | 370/442 |
| 7,072,427 | B2 * | 7/2006 | Rawlins et al. | 375/346 |
| 7,130,359 | B2 * | 10/2006 | Rahman | 375/316 |
| 7,313,198 | B2 * | 12/2007 | Rahman et al. | 375/297 |
| 7,496,340 | B1 * | 2/2009 | Chen et al. | 455/296 |
| 7,603,094 | B2 * | 10/2009 | Rahman et al. | 455/241.1 |
| 7,777,546 | B2 * | 8/2010 | Liu | 327/307 |
| 7,899,431 | B2 * | 3/2011 | Rahman et al. | 455/324 |
| 7,912,437 | B2 * | 3/2011 | Rahman et al. | 455/296 |
| 2006/0105735 | A1 * | 5/2006 | Ibrahim et al. | 455/324 |
| 2007/0293180 | A1 | 12/2007 | Rahman et al. | |

* cited by examiner

*Primary Examiner* — Christian A Hannon

(57) ABSTRACT

A direct conversion receiver (200) includes a low noise amplifier (LNA) (213), at least one baseband amplifier (119, 123 and 127), register banks (250 and 251) for storing a plurality of offset data corresponding to at least two LNA gain settings and a plurality of baseband gain settings, a DC offset correction system (235) for providing a DC offset signal, a state machine (275) for sequencing through each of the plurality of baseband gain settings and through enable and disable states for the LNA, and a processor (290) programmed to activate the state machine and to run the DC offset correction system.

9 Claims, 3 Drawing Sheets

DC OFFSET CALIBRATION IN A DIRECT CONVERSION RECEIVER

BACKGROUND OF THE INVENTION

1. Field of the Invention

This invention relates generally to radio frequency receivers, and more specifically to reducing direct current (DC) offset in a direct conversion receiver.

2. Related Art

Direct current (DC) offset in a zero-IF, or direct conversion, receiver is a known concern that normally should be dealt with for such receiver to operate properly. DC offset may be viewed as an error term that is added to, and becomes part of, a received signal. DC offset can result from mismatches within a receiver lineup, e.g., mismatches in quadrature mixers, amplifiers and/or filters. These mismatches may be more pronounced in receiver lineups that are implemented substantially in integrated circuit form because techniques, such as suitable blocking capacitors, are not readily available to mitigate the DC offset.

In one known method, a DC offset calibration is performed with a first-order mixed-signal control loop in order to correct for any DC offset. The control loop increases the usable dynamic range through an analog baseband signal path of the direct conversion receiver.

FIG. 1 is a block diagram of a known direct conversion receiver 100 that includes a DC offset correction system 135. A received signal at a radio frequency (RF) from an antenna 109 is coupled via a transmit/receive (T/R) switch 111 to a low noise amplifier (LNA) 113. The LNA 113 is a switchable gain amplifier that amplifies the RF signal. The output of the LNA 113 is coupled to a mixer 105 via a capacitor 114. The receiver 100 includes a local oscillator (LO) 117 coupled to a quadrature generator 118. The quadrature generator 118 phase shifts the signal from the LO 117 by 90°. The quadrature generator 118 provides an oscillator signal to the in-phase (I-phase) mixer 105 and an oscillator signal phase shifted by 90° to a quadrature-phase (Q-phase) mixer (not shown). In FIG. 1, only the I-phase receive path and the I-phase mixer 105 are shown. The mixer 105 is driven by a signal from the quadrature generator 118 having a frequency that is nominally equal to the frequency of the RF signal, and thus the desired output signal from the mixer is nominally at 0-Hz. A front end of the front end of the receiver 100 includes the T/R switch 111, the LNA 113 and the quadrature generator 118.

The receiver 100 includes an amplifier 119, which is a variable gain amplifier with a gain that can be changed via a control signal 120. The amplifier 119 is coupled to a lowpass filter 121 with a bandwidth selected to correspond to the bandwidth of the received RF signal. The output from lowpass filter 121 is coupled to an amplifier 123 having a variable gain that can be changed via a control signal 124. The output from the amplifier 123 is coupled to another lowpass filter 125. The output of lowpass filter 125 is coupled to an amplifier 127 that also has a variable gain. The output of the amplifier 127 drives an analog-to-digital converter (ADC) 129, to provide I-samples at the output of the ADC. The I-samples are fed to a DC offset correction system 135. The DC offset correction system 135 operates to detect and determine the level of any DC offset in the receiver 100, and to provide signals via a digital-to-analog converter (DAC) 137 to an input of the lowpass filter 125, so as to reduce the DC offset at the input of the ADC 129.

The receiver 100 includes an automatic gain control (AGC) 143 that provides a control signal at 149 to control the T/R switch 111 to change between receive and transmit modes of operation. The AGC 143 also provides a control signal at 115 to control gain of the LNA 113 during open loop calibration, i.e., during normal receive operation. The AGC 143 does not control gain of the LNA 113 during closed loop calibration. The AGC 143 also generates a gain control signal at 145 that is coupled to a decoder 147. The decoder 147 performs a mapping function to convert the gain control signal at 145 to respective, control signals at 120, 124 and 128. The decoder 147 provides the control signals at 120, 124 and 128 based on a received signal strength, gain status, and non-uniform gain control steps of the amplifiers 119, 123 and 127, such that an appropriately limited signal amplitude is presented to the ADC 129.

The DC offset correction system 135 includes a register bank 150 that is configured to store a plurality of offset data corresponding to a plurality of gain settings for the receiver 100, i.e., offset data corresponding to each of a plurality of gain settings for the amplifiers 119, 123 and 127. The DC offset correction system 135 provides an offset signal at 154. The offset signal at 154 is a digital signal that is delayed at a delay stage 156, and then applied to the DAC 137 with a resultant analog signal coupled to an adder 158. The analog signal is combined with, i.e., subtracted from, the received signal and thereby shifts the received signal so as to reduce or substantially eliminate any DC offset at the input to the ADC 129. The DC offset correction system 135 includes a decimation filter 168 that is coupled to the output of the ADC 129. The output of the decimation filter 168 is coupled to a decimator 170. The signal from the decimator 170 is coupled to a gain stage 174. The output from the gain stage 174 is applied to a loop filter 176 that acts as an integrator. The loop filter 176 comprises an adder 180, a multiplexer 182 and a one clock cycle delay element ($z^{-1}$) 184. The output of the loop filter 176 is coupled to a decimator 186. Additionally, the DC offset correction system 135 includes control circuitry 190 that is coupled to a non-volatile memory 196, to the loop filter 176, and to the register bank 150.

The DCOC correction system 135 is designed to operate in the presence of only noise, i.e., no signal. A signal should not be present at the antenna 109 while performing the DCOC calibration in order to avoid having the DCOC calibration algorithm settle on an incoming RF signal. Because the DCOC correction system 135 performs DCOC calibration in the field, the DCOC calibration is performed with the front end of the receiver 100 disabled, which means the antenna 109 is disconnected from the receiver by the T/R switch 111 and the LNA 113 is disabled. Disadvantageously, the DCOC correction system 135 cannot perform DCOC calibration when the LNA 113 is enabled because an incoming signal would adversely affect the DCOC calibration.

Typically, most of the components shown in FIG. 1 are located on a single integrated circuit chip 101; however, the antenna 109, the T/R switch 111 and the LNA 113 are located off the chip 101.

It is desirable to prevent any self-mixing at the mixer 105 that results in a DC offset at the output of the mixer. Self-mixing at the mixer 105 occurs as a result of leakage of the LO signal. Leakage of the LO signal occurs because of a lack of complete isolation between the LO 117 and the LNA 113. Any DC offset at the output of the mixer 105 is amplified by the amplifiers 119, 123 and 127, thus saturating the baseband lineup.

The mixing of signals having identical frequency characteristic results in a DC offset at the output of the mixer 105. For example, leakage of the input RF signal may disadvantageously appear at the input port of the mixer 105 to which the LO signal is inputted. The leakage components are driven to the mixer 105 together with the LO signal. Consequently, the input RF signal is mixed with the leakage components of itself at mixer 105.

Similarly, leakage of the LO signal may disadvantageously appear at the input port of the mixer 105 to which input RF signal is inputted. The leakage components are driven to the mixer 105 together with the input RF signal. Consequently, the LO signal is mixed with the leakage components of itself at the mixer 105. For example, LO leakage occurs when the LO signal $\cos \omega_{LO} t$ from the LO 117 is inputted into the mixer 105 at the input port to which input RF signal is inputted. The leakage signal is self-mixed with the LO signal, as shown in the following equation, and, as a result, a DC offset occurs.

$$(\cos \omega_{LO} t)(\cos \omega_{LO} t) = \frac{1}{2} + \cos 2\omega_{LO} t$$

The DC offset corresponding to the ½ term in the preceding equation causes one or more of the amplifiers 119, 123 and 127 to saturate.

Furthermore, the LO signal may also leak from the RF signal input port of the mixer 105 and be disadvantageously reflected at the output port of the LNA 113 and/or at the antenna 109. LO leakage can occur through conductive, magnetic or RF means, including due to substrate coupling and/or bond wire coupling.

With known circuits, the self-mixing that occurs as a because of LO leakage results in additional DC offsets during open loop calibration that were not present during closed loop calibration. Such additional DC offsets (due to self-mixing) do not occur during closed loop calibration because the LNA 113 is disabled (i.e., turned off) during the closed loop calibration.

In the circuit of FIG. 1, the LNA 113 is not located on the same chip 101 as the LO 117. Although the receiver 100 functions adequately when the LNA 113 and the LO 117 are not on the same chip 101, the receiver may not operate adequately if the LNA and the LO were on the same chip.

Known DC offset correction methods and apparatus, including the circuit shown in FIG. 1, will not operate properly when LO leakage and self-mixing are present.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION OF AN EXEMPLARY EMBODIMENT

Figure 1:
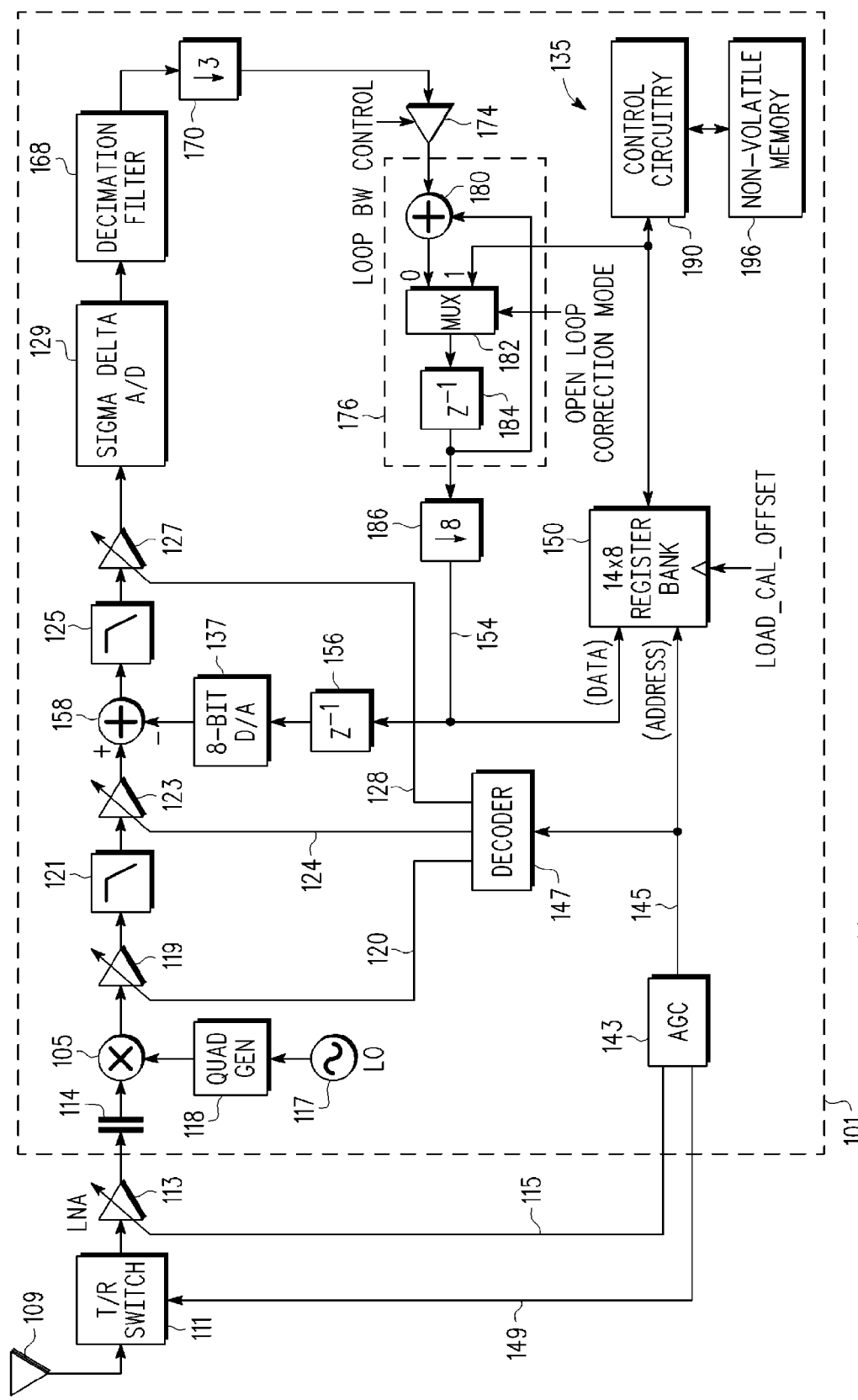
FIG. 1 is a simplified functional block diagram of a portion of a direct-conversion receiver with a known DC offset correction system.
Figure 2:
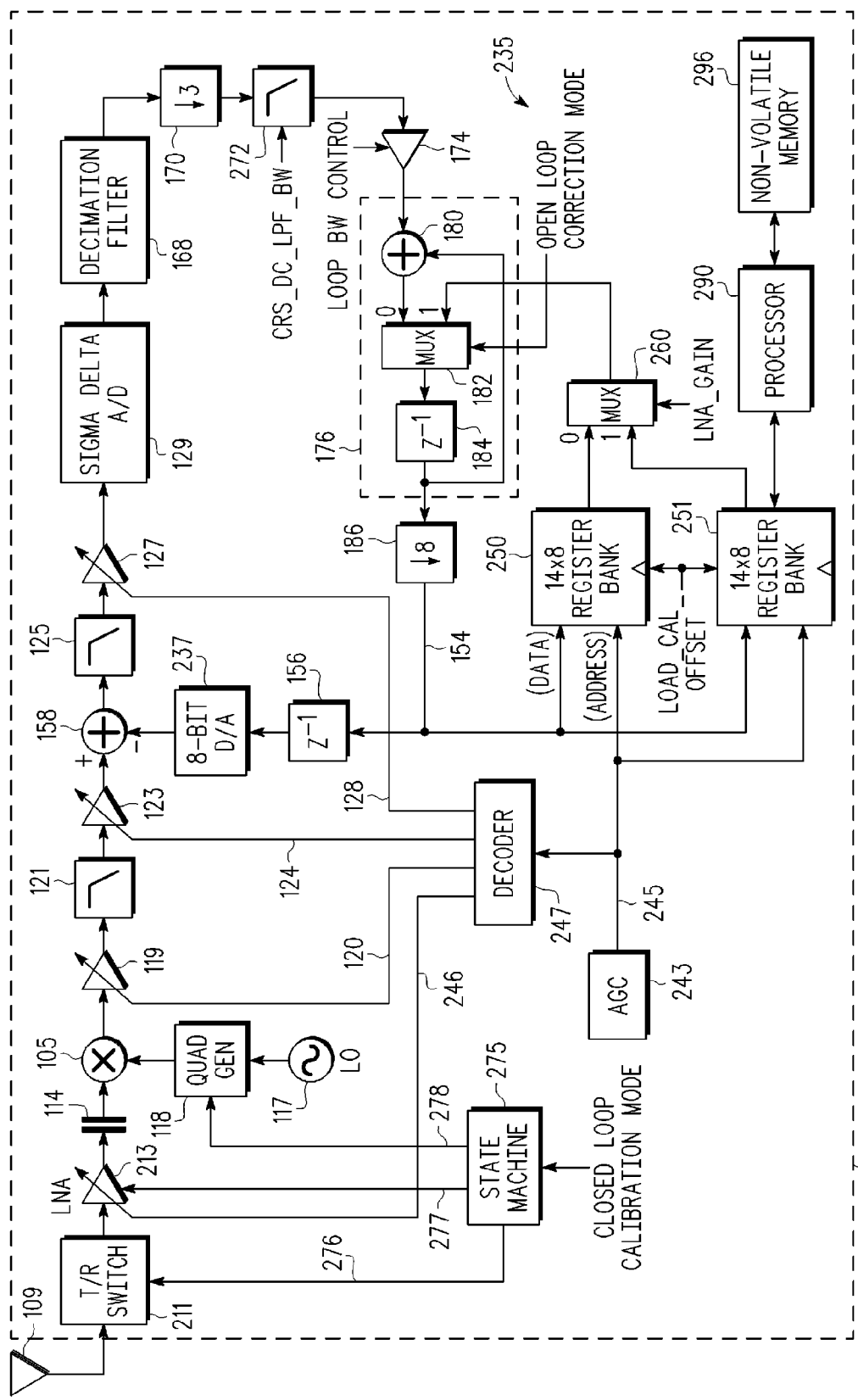
FIG. 2 is a simplified functional block diagram of a portion of a direct-conversion receiver with a DC offset correction system in accordance with the invention.

FIG. 2 is a simplified functional block diagram of a portion of a direct conversion receiver 200 including a DC offset correction system 235, in accordance with the invention. A received signal at a radio frequency (RF) from an antenna 109 is coupled via a transmit/receive (T/R) switch 211 to a low noise amplifier (LNA) 213. It should be understood that a transmitter (not shown) may be coupled to the circuit shown in FIG. 2, in which case, the RF output from the transmitter is coupled to the T/R switch 211, so as to allow the antenna 109 to be used alternately for transmit and receive modes of operation. The LNA 213 amplifies a received RF signal. The LNA 213 is a switchable gain amplifier with a gain that can be changed in one or more steps via a control signal at 115. In an exemplary embodiment, the LNA has two (2) gain settings, which are a high gain setting and a low gain setting. The output of the LNA 213 is coupled to a mixer 105. The receiver 200 includes a local oscillator (LO) 117 coupled to a quadrature generator 118. The quadrature generator 118 phase shifts a signal from the LO 117 by 90°. The quadrature generator 118 provides an oscillator signal to the in-phase (I-phase) mixer 105 and an oscillator signal phase shifted by 90° to a quadrature-phase (Q-phase) mixer (not shown). In FIG. 2, only the I-phase receive path and the I-phase mixer 105 are shown. The mixer 105 is driven by a signal from the quadrature generator 118 having a frequency that is nominally equal to the frequency of the received RF signal, and thus the desired output signal from the mixer is nominally at 0-Hz. The LNA 213 is coupled to the mixer 105 via a capacitor 114. A front end of the front end of the receiver 200 includes the T/R switch 211, the LNA 213 and the quadrature generator 118. A back end of the receiver 200 includes the baseband portions of the receiver.

The output from the mixer 105 is coupled to an amplifier 119, which is a variable gain baseband amplifier. In an exemplary embodiment, the amplifier 119 has six (6) settings. The amplifier 119 is coupled to a lowpass filter 121 having a bandwidth selected to correspond to the bandwidth of the RF signal. The output from the lowpass filter 121 is coupled to an amplifier 123, which is a variable gain baseband amplifier. In an exemplary embodiment, the amplifier 123 has five (5) settings. The output from the amplifier 123 is coupled to another lowpass filter 125. The output of lowpass filter 125 is coupled to an amplifier 127, which is a variable gain baseband amplifier. In an exemplary embodiment, the amplifier 127 has five (5) settings.

The output of the amplifier 127 drives an analog-to-digital converter (ADC) 129, to provide I-samples at the output of the ADC. The ADC 129 has a finite dynamic range and for many receiver applications must provide significant output resolution over a relatively large signal amplitude range. Therefore, any DC offset at the input to the ADC 129 can detract from the dynamic range or otherwise contribute to nonlinear performance. Consequently, any DC offset is removed, reduced or otherwise mitigated prior to the input to the ADC 129.

The I-samples are fed to the offset correction system 235 and to a channel filter (not shown) of the receiver 200. The DC offset correction system 235 operates to detect and determine the level of any DC offset in the receiver 200, and to provide signals, via a digital-to-analog converter (DAC) 237, to an input of the amplifier 127, so as to reduce the DC offset at the input of the ADC 129.

The receiver 200 includes an automatic gain control (AGC) 243 that generates a gain control signal at 245 that is inputted into a decoder 247. The decoder 247 performs a mapping function to convert the gain control signal at 245 to respective control signals at 120, 124, 128 and 246. The control signal at 120 controls the gain of the amplifier 119. The control signal at 124 controls the gain of the amplifier 123. The control signal at 128 controls the gain of the amplifier 127. The control signal at 246 controls the gain of the LNA 213.

The decoder 247 provides a set of control signals 120, 124, 128 and 246 based on a received signal strength, gain status, and non-uniform gain control steps of the amplifiers 119, 123 and 127, and the gain of the LNA 213, such that an appropriately limited signal amplitude is presented to the ADC 129. For example, due to the non-uniform gain changing steps of the amplifiers 119, 123 and 127, a signal increase may result in a gain reduction at amplifier 123 and a gain increase at amplifier 119.

The DC offset correction system 235 comprises register banks 250 and 251 that are configured to store a plurality of DC offset data corresponding to a plurality of gain settings for the receiver 200, i.e., offset data corresponding to each gain setting for the LNA 213 and the amplifiers 119, 123 and 127. Register bank 250 stores the offset data corresponding to a high gain setting of the LNA 213 and various gain settings of the amplifiers 119, 123 and 127. Register bank 251 stores the offset data corresponding to a low gain setting of the LNA 213 and the various gain settings of the amplifiers 119, 123 and 127. The output from each register bank 250 and 251 is coupled to a multiplexer 260 that has an LNA_GAIN signal as a control signal. When the LNA_GAIN signal is high, the offset data from register bank 251 is coupled to a loop filter 176. When the LNA_GAIN signal is low, the offset data from register bank 250 is coupled to the loop filter 176.

The DC offset correction system 235 includes a processor 290. The function of the processor 290 is to read the contents of the register banks 250 and 251 and to store these values into a non-volatile memory (NVM) 296 for future use. The processor 290 and the AGC 243 control the state of the LNA_GAIN signal. Upon power-up, the processor 290 reads the values from the NVM 296 and writes them back into the register banks 250 and 251. The processor 290 also controls the address input of the register banks 250 and 251.

The DC offset correction system 235 is configured to operate in both a closed loop configuration and an open loop configuration, and to provide an offset signal at 154. The offset signal at 154 is a digital signal that is delayed at a delay stage 156 by one or more clock cycles, and then applied to the DAC 237 with a resultant analog offset signal coupled to the adder 158. At the adder 158, the analog offset signal is combined with, i.e., subtracted from, the received signal, thereby shifting the received signal so as to reduce or substantially eliminate any DC offset at the input to the ADC 129. The delay stage 156 aligns changes in the analog offset signal with corresponding changes in gain of the amplifiers 119, 123 and 127 so as to reduce any transients that may be seen at the input to the ADC 129.

The DC offset correction system 235 includes a decimation filter 168 that is coupled to the output of the ADC 129. The output of the decimation filter 168 is coupled to a decimator 170, which, in the exemplary embodiment, decimates the signal by a factor of three (3). The signal from the decimator 170 is coupled to a lowpass filter 272. The output from the decimator 170 is filtered using the lowpass filter 272 to sufficiently attenuate any strong adjacent channel and close-in interferers. A presence of such interferers during the DC calibration process can degrade the correction accuracy and track time. In an exemplary embodiment, the lowpass filter 272 is a first order, single pole, zero infinite impulse response filter. The bandwidth of the lowpass filter 272 is programmable via a coarse DC lowpass filter bandwidth, or CRS_DC_LPF_BW, signal. The processor 290 controls the state of the CRS_DC_LPF_BW signal. The output from the lowpass filter 272 is coupled to a gain stage 174.

The output from the gain stage 174 is applied to the loop filter 176 that acts as an integrator. The loop filter 176 comprises an adder 180, a multiplexer 182 and a one clock cycle delay element ($z^{-1}$) 184. The select line of the multiplexer 182 is coupled to an OPEN_LOOP_CORRECTION_MODE signal. Open loop correction mode refers to a mode that occurs during normal receive operation when open loop DC offset corrections are made by accessing the output of the register banks 250 and 251. When DCOC calibration is not being performed, the DC offset correction system 235 is in open loop correction mode. The output of the loop filter 176 is coupled to a decimator 186. The output signal from the loop filter 176 is decimated by a factor of eight (8) in the exemplary embodiment. The loop filter 176 minimizes the DC offset error at the output of the amplifier 123. At the end of each integration period, final DCOC settings of the DAC 237 are stored in register banks 250 and 251.

The multiplexer 182 controls whether the DC offset correction system 235 is operating in a closed loop mode or in an open loop mode. The processor 290 controls the state of the OPEN_LOOP_CORRECTION_MODE signal. For example, when the OPEN_LOOP_CORRECTION_MODE signal is high, the DC offset correction system 235 operates in the open loop mode and the loop filter 176 is essentially disabled. In the open loop mode, the multiplexer 182 is loaded with the signal at the "1" input of the multiplexer, and, after a one cycle delay, this signal is provided at the output of the loop filter. The signal at the "1" input of the multiplexer 182 is offset data that is stored in the register banks 250 and 251 at an address corresponding to a present gain setting. After decimation at the decimator 186, a digital word is provided at 154 as the offset signal, which is coupled to the delay stage 156 and from there to the DAC 237. In an exemplary embodiment, the DAC 237 has a ±256 mV correction range in 2 mV steps. The DAC 237 converts the digital offset signal to an analog offset signal that is coupled to the adder 158. Alternatively, when the control input is low, the signal at the "0" input of the multiplexer 182 is coupled through the multiplexer, and the loop filter 176 operates as a loop filter, and the DC offset correction system 235 operates in the closed loop mode with the loop filter filtering or integrating the signal at the output of the lowpass filter 272. The DC offset correction system 235 operates in the closed loop mode in order to update or calibrate offset information for subsequent use by the offset correction system, and operates in the open loop mode to reduce any DC offset that would otherwise be presented to the ADC 129. After the DC offset correction system 235 has operated in the closed loop mode with a given gain setting for a brief period of time, a resulting offset signal is loaded into the register banks 250 and 251 at the address corresponding to a present gain setting. The register banks 250 and 251 are loaded under control of the processor 290, and loading is initiated by a LOAD_CAL_OFFSET signal. By repeating the closed loop operation and storing results for each of the various gain settings, the offset data in the register banks 250 and 251 are calibrated for the plurality of gain settings and the DC offset correction system 235 can thereafter operate in the open loop mode using the appropriate offset data as addressed by the corresponding gain setting.

The DC offset correction system 235 includes a state machine 275. The state machine 275 sequences though all baseband gain steps. The state machine 275 is coupled to the T/R switch 211 via 276 so as to enable the T/R switch for receive operation and to disable the T/R switch for closed loop calibration. The state machine 275 is coupled to the LNA 213 via line 277 so to enable and disable the LNA. The state machine 275 is coupled to the quadrature generator 118 via 278 so as to enable and disable the quadrature generator. The state machine 275 is activated by a CLOSED_LOOP_CALIBRATION_MODE signal from the processor 290. During the closed loop calibration, the state machine 275 cycles through enable and disable values of the T/R switch 211, the LNA 213 and the quadrature generator 118 for each gain setting of the amplifiers 119, 123 and 127. During field calibration, the state machine 275 outputs only the programmable values for the T/R switch 211, the LNA 213 and the quadrature generator 118 that correspond to the disabled setting. Alternatively, during field calibration, the state machine 275 outputs the programmable value for at least the LNA 213 that corresponds to the disabled setting, and outputs programmable values for one or both of the T/R switch 211 and the quadrature generator 118 that correspond to enabled settings.

Except for the antenna 109, all the components of the receiver 200 shown in FIG. 2 are located on a single integrated circuit substrate, or chip, 201. A balun (not shown), which converts between unbalanced signals and balanced signals, and which is positioned in the circuit shown in FIG. 2 between the antenna 109 and the T/R switch 211, is also located off the chip 201. It should be understood that the single signal path shown between many of the analog functional blocks shown in FIG. 2, represents a pair of differential signal paths. Unlike the T/R switch 111 and the LNA 113 of the known receiver 100, the T/R switch 211 and the LNA 213 of the receiver 200 are on the same chip 201 as are the other components of the receiver 200. Leakage of the LO signal is more likely to occur when the LNA 213 and the LO 117 are on a same chip, such as chip 201, than when they are not on the same chip.

It has been empirically shown that DC offsets vary as a function of the gain of the LNA 213. In other words, varying the gain of the LNA 213 between high gain and low gain varies the DC offset at the output of the mixer 105. Therefore, the method in accordance with the invention performs the DCOC calibration as a function of gain of the LNA 213. DCOC calibration is performed with the LNA 213 in a high gain state. In order to properly perform DCOC calibration with the LNA 213 in the high gain state, the DCOC calibration is performed in a controlled RF environment, such as a factory test environment in which RF signals originating from outside the factory test environment are essentially blocked, to prevent the DCOC calibration algorithm from settling on any incoming RF signal. Measurements have confirmed that a DCOC calibration performed with the T/R switch 211 enabled and the LNA 213 enabled at low gain is equivalent to a DCOC calibration performed with the T/R switch disabled and the LNA disabled. When the LNA 213 is enabled and at low gain, the LO leakage signal is not amplified by the LNA 213 to a large enough level to create additional DC offsets from self-mixing. Therefore, instead of performing DCOC calibration with the LNA 213 in a low gain state, a method in accordance with the invention performs DCOC calibration with the LNA disabled.

In an exemplary embodiment, the LNA 213 has an 8 dB low gain setting and a 30 dB high gain setting. The 8 dB low gain setting is, with respect to the production of self-mixing, functionally equivalent to the LNA 213 being off. In other words, at the 8 dB gain setting, the amount of self-mixing due to LO leakage is negligible.

The method in accordance with the invention performs coarse DCOC calibration as a function of the gain of the LNA 213, such that the DC offsets created from self-mixing are calibrated out when the front end of the receiver 200 is enabled.

Figure 3:
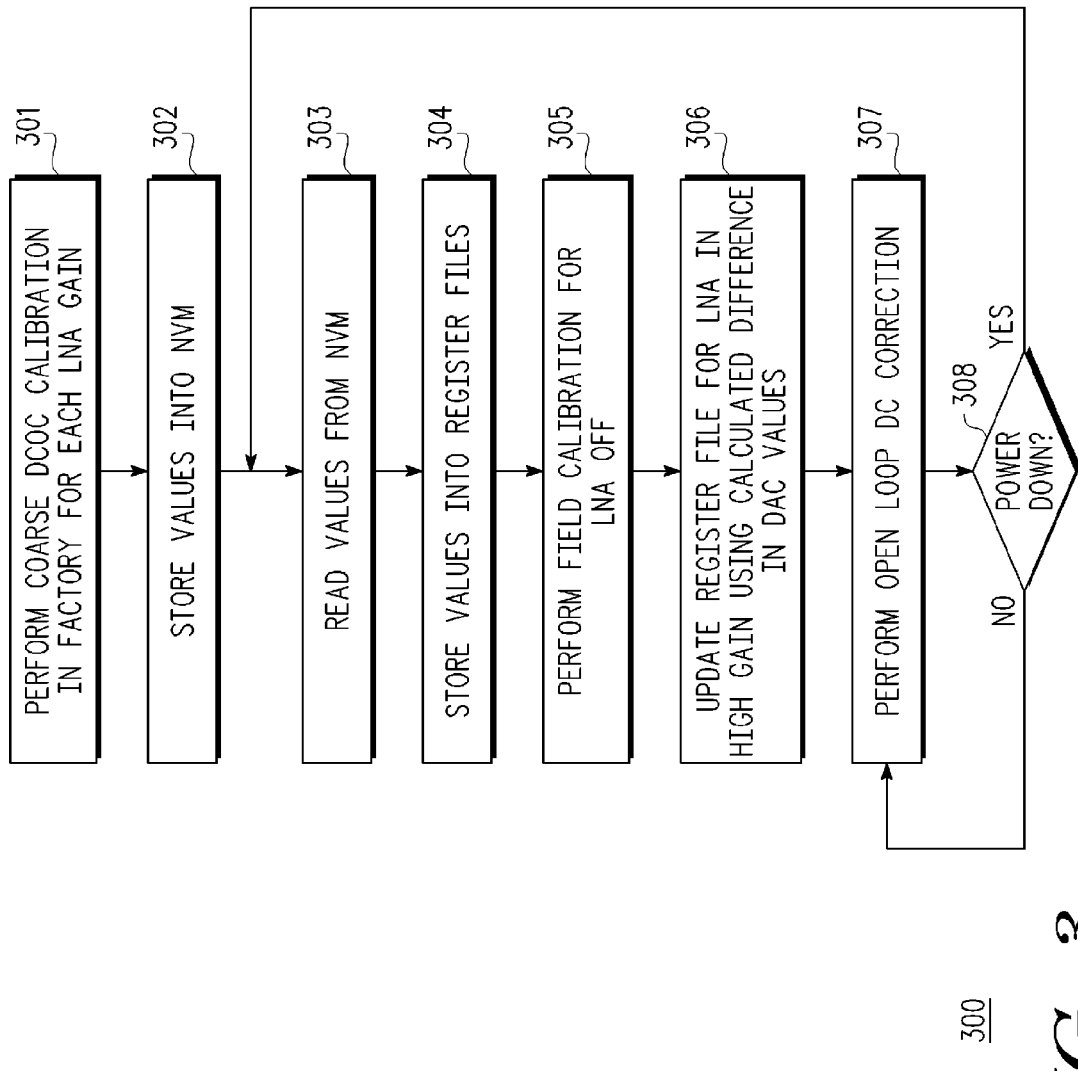
FIG. 3 is a simplified function flow diagram of a method in accordance with the invention.

FIG. 3 illustrates a flow diagram 300 of a method of performing coarse DCOC calibration as a function of the gain of the LNA 213. The method begins at step 301 by performing initial DCOC calibrations for all combinations of gain settings of the LNA 213 and the amplifiers 119, 123 and 127. Because the initial DCOC calibrations include combinations with the LNA 213 at high gain that must be performed in a controlled RF, or factory, environment, all the initial DCOC calibrations can be performed in the controlled RF environment (hereinafter referred to as "factory calibration" to distinguish such calibration from "field calibration"). The state machine 275 controls the state of the T/R switch 211, the LNA 213 and the quadrature generator 118 during factory calibration. Tester software runs on the processor 290 to perform the steps indicated in the flow diagram 300.

A first set of factory calibrations is performed with the T/R switch 211 disabled, i.e., the LNA 213 not coupled to the antenna 109, with the LNA 213 disabled, and with the quadrature generator 118 disabled. In other words, the first set of factory calibrations is performed with the front end of the receiver 200 disabled. Alternatively, the first set of factory calibrations is performed with only the LNA 213 disabled. As another alternative, the first set of factory calibrations is performed with the LNA 213 and either the T/R switch 211 or the quadrature generator 118 disabled. A second set of factory calibrations is performed with the T/R switch 211 closed, i.e., the LNA 213 coupled to the antenna 109, with the gain of the LNA enabled and set to high, and with the quadrature generator 118 enabled. That is, the second set of factory calibrations is performed with the front end of the receiver 200 enabled. By performing the second set of factory calibrations in the factory, the algorithm does not settle on any incoming RF signal as it would if calibrations were performed in the field with the front end enabled. Although denominated "first" and "second" sets of DCOC calibrations, the calibration sets can be performed in any order. During factory calibration, the DC offsets resulting from the self-mixing of the LO signal at the mixer 105 are removed by DC offset calibration, for both gain settings of the LNA 213 and for each gain setting of the amplifier 119, 123 and 127. Because the front end of the receiver 200 is enabled during factory calibration, the antenna 109 is connected to a dummy 50 ohm load so that the DCOC algorithm does not settle on any RF signal.

For each combination of gain settings of the LNA 213 and the amplifiers 119, 123 and 127, the DC offset is measured, and the results (i.e., the gain settings of the amplifiers and DCOC settings of the DAC 237) are stored at step 302 in the NVM 296. In other words, the results of the first set of factory calibrations and the results of the second set of factory calibrations are stored in the NVM 296.

Next, tester software running on the processor 290 reads at step 303 the values from the NVM 296. Then, at step 304, the tester software running on the processor 290 reads values from the NVM 296 and loads the values into register banks 250 and 251. The results of the first set of factory calibrations are loaded into register bank 250. The results of the second set of factory calibrations are loaded into register bank 251.

At step 305, the receiver 200 performs, in the field, a first set of field calibrations with the front end of the receiver 200 disabled (i.e., with the T/R switch 211, the LNA 213 and the quadrature generator 118 disabled). Of course, if one of the alternative methods were used in step 301, states for the T/R switch 211, the LNA 213 and the quadrature generator 118 that correspond to the states used in step 301 would be used in step 305. The values for DC offset data determined at step 305 are loaded into register bank 250, thereby updating and replacing the values from the first set of factory calibrations. The values for DC offset data determined in the field can be expected to be different from the values determined in the factory because of a difference between temperature of the receiver 200 in the factory and temperature of the receiver in the field, and/or because of device aging occurring between date of the factory calibration and date of the field calibration and/or because of other factors.

At step 306, a comparison between the initial first set of factory settings arrived at during factory calibration (with the T/R switch 211 disabled, the LNA 213 disabled and the quadrature generator 118 disabled) and the subsequent first set of field settings arrived at during field calibration (with the T/R switch 211 disabled, the LNA 213 disabled and the quadrature generator 118 disabled) is made. Any differences between the first set of DCOC settings arrived at during factory calibration and the first set of DCOC settings arrived at during field calibration are calculated. The differences are then used to change the values of the register bank 251 to create new values. The new values correspond to values for a second set of DCOC settings (for subsequent use in the field with the T/R switch 211 closed, the gain of the LNA 213 set high and the quadrature generator 118 enabled). In other words, the values for the second set of DCOC settings are calculated, not measured, in the field.

Any difference between the second set of DCOC settings measured in the factory and the second set of DCOC settings calculated in the field are typically caused by device aging and/or by temperature change that occurs between conditions in the factory and subsequent conditions in the field. It should be noted that the loop filter 176 is not used to directly determine in the field the gain settings of the amplifiers 119, 123 and 127 when the LNA 213 is at the high gain setting. The calculated second set of DCOC settings in register bank 251 will be used by the receiver 200 in the field when the AGC 243 sets the gain of the LNA 213 high.

At step, 307, the DC offset correction system 235 performs open loop coarse DC correction, using the values currently, or presently, in the register banks 250 and 251 for gain settings of amplifiers 119, 123 and 127, which that were updated in step 306.

At step 308, a determination made whether the receiver 200 remains powered, and if it remains powered, the step 307 is performed next at a subsequent time. On the other hand, if determination is made the receiver 200 no longer remains powered, then step 303 is performed when the receiver is powered up again.

The field calibration is utilized to compensate for any change in the baseband DC offsets over temperature and drift. The receiver 200 and the method in accordance with the invention removes during factory calibration and field calibration the DC offsets introduced from LO leakage and self-mixing. The DC offset correction system 235 prevents LO leakage and self-mixing from saturating the ADC 129.

The DC offset correction system 235 and method in accordance with the invention can be used with any receiver disposed on an integrated circuit substrate which has an LNA disposed on the same integrated circuit substrate. Moreover, the DC offset correction system 235 and method in accordance with the invention can be used with any receiver having an LNA that is susceptible to LO leakage and self-mixing.

Aspects of a DC offset correction system not fully described herein are described in U.S. Patent Application Publication No. US2007/0293180, filed Jun. 14, 2006, by Rahman et al., entitled DC OFFSET CORRECTION FOR DIRECT CONVERSION RECEIVERS, and assigned to the assignee of the present application, which is hereby fully incorporated by reference herein.

It should be understood that all circuitry described herein may be implemented either in silicon or another semiconductor material or alternatively by software code representation of silicon or another semiconductor material.

Although the invention is described herein with reference to specific embodiments, various modifications and changes can be made without departing from the scope of the present invention as set forth in the claims below. Although the LNA 213 in the exemplary embodiment has two gain settings, the method is also applicable to an LNA having more than two gain settings. Although the receiver 200 in the exemplary embodiment has three post-mixer amplifiers 119, 123 and 127, the method is also applicable to a receiver having a larger or smaller number of post-mixer amplifiers. In the exemplary embodiment, the receiver 200 is disposed on an integrated circuit fabricated using CMOS technology; however, the invention can also be used on an integrated circuit fabricated using other technologies. In the exemplary embodiment, the receiver 200 is a zero-IF receiver; however, the invention can also be used with a near zero-IF receiver.

Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method of DC (direct current) offset calibration in a direct conversion receiver, the method comprising:
   a) setting a gain of a low noise amplifier (LNA) to a first LNA gain, and calibrating a DC offset correction system over each of a plurality of baseband gain settings of at least one baseband amplifier to provide a plurality of initial first offset data, and storing the plurality of initial first offset data;
   b) setting the gain of the LNA to a second LNA gain, and calibrating the DC offset correction system over each of the plurality of baseband gain settings of the at least one baseband amplifier to provide a plurality of initial second offset data, and storing the plurality of initial second offset data, wherein step b) is performed in a radio frequency (RF) controlled environment;
   c) subsequent to step a), setting the gain of the LNA to the first LNA gain and calibrating the DC offset correction system over each of the plurality of baseband gain settings of the at least one baseband amplifier to provide a plurality of subsequent first offset data, and storing the plurality of subsequent first offset data;
   d) calculating a plurality of differences between each of the plurality of the initial first offset data and respective each of the plurality of the subsequent first offset data;
   e) calculating a plurality of subsequent second offset data, such that each of the plurality of subsequent second offset data is equal to each of the plurality of respective initial second offset data plus each of the plurality of respective differences from step d), and storing the plurality of subsequent second offset data;
   f) based on a present gain of the LNA and a present baseband gain of the at least one baseband amplifier, selecting one of the plurality of subsequent first offset data or one of the plurality of subsequent second offset data; and
   g) operating the DC offset correction system using a selected one of the plurality of subsequent first offset data or one of the plurality of subsequent second offset data, to correct for a DC offset in the direct conversion receiver.

2. The method of claim 1, in which the LNA is operable at low gain and at high gain, and in which the LNA operates at low gain when the gain of the LNA is set to the first LNA gain, and in which the LNA operates at high gain when the gain of the LNA is set to the second LNA gain.

3. The method of claim 1, in which the direct conversion receiver is operable with the LNA disabled and with the LNA at high gain, and in which the LNA is disabled when the gain of the LNA is set to the first LNA gain, and in which the LNA operates at high gain when the gain of the LNA is set to the second LNA gain.

4. The method of claim 1, in which the LNA has a disabled setting and a plurality of gain settings, and in which the first LNA setting is the LNA disabled setting and in which the second LNA setting is one of the plurality of gain settings.

5. The method of claim 1, in which the DC offset correction system is operated in a closed loop configuration for steps a), b) and c).

6. The method of claim 1, in which the DC offset correction system is operated in an open loop configuration for step g).

7. The method of claim 1, in which the direct conversion receiver and the LNA are disposed on a same integrated circuit substrate.

8. The method of claim 1, in which the direct conversion receiver includes register banks for storing the plurality of initial first offset data, the plurality of initial second offset data, and the plurality of subsequent first offset data.

9. The method of claim 8, in which the direct conversion receiver includes a processor, coupled to the register banks, for calculating the plurality of subsequent second offset data.

* * * * *